United States Patent
Cohen

(10) Patent No.: US 6,479,089 B2
(45) Date of Patent: Nov. 12, 2002

(54) SOY-BASED DOUGH AND PRODUCTS MADE FROM THE DOUGH

(76) Inventor: Deborah W. Cohen, P.O. Box 17, Butler, MD (US) 21023

(*) Notice: Subject to any disclaimer, the term of this patent is extended or adjusted under 35 U.S.C. 154(b) by 0 days.

(21) Appl. No.: 09/907,698

(22) Filed: Jul. 19, 2001

(65) Prior Publication Data

US 2001/0055642 A1 Dec. 27, 2001

Related U.S. Application Data

(62) Division of application No. 09/571,925, filed on May 16, 2000, now Pat. No. 6,291,009.

(51) Int. Cl.7 .................. A21D 13/04; A21D 13/06; A21D 13/00; A23L 1/20; A23J 3/16
(52) U.S. Cl. .................. 426/550; 426/560; 426/634
(58) Field of Search ................. 426/550, 560, 426/634

(56) References Cited

U.S. PATENT DOCUMENTS

| | | | |
|---|---|---|---|
| 3,615,677 A | 10/1971 | Scharschmidt et al. | |
| 3,843,821 A | * 10/1974 | Glade et al. | |
| 3,919,434 A | 11/1975 | Tsen et al. | |
| 4,623,550 A | 11/1986 | Willard | |
| 4,770,891 A | * 9/1988 | Willard | |
| 5,026,568 A | 6/1991 | Takemori et al. | |
| 5,362,511 A | 11/1994 | Villagran et al. | |
| 5,591,471 A | 1/1997 | Niwano et al. | |
| 5,925,396 A | 7/1999 | Reed et al. | |
| 5,928,700 A | 7/1999 | Zimmerman et al. | |
| 6,001,409 A | 12/1999 | Gimmler et al. | |

* cited by examiner

Primary Examiner—Anthony J. Weier
(74) Attorney, Agent, or Firm—Leydig, Voit & Mayer, Ltd.

(57) ABSTRACT

A cohesive machineable dough having a high soy content and products made from the dough are described. The dough contains a soy-component, a pre-gelatinized starch component, a liquid component, and optionally other ingredients. Preferably, the soy-component contains from about 60% to about 90% of the dry ingredients, the pre-gelatinized starch component contains from about 10% to about 40% of the dry ingredients, and water contains from about 25% to 45% of the total dough. The dough may be sheeted, cut, and baked to produce products such as flatbreads, crackers, chips, and other snack and bread products of various cuisines. The dough may also be fried after baking.

22 Claims, No Drawings

SOY-BASED DOUGH AND PRODUCTS MADE FROM THE DOUGH

This application is a divisional of U.S. application No. 09/571,925, filed May 16, 2000, now U.S. Pat. No. 6,291,009.

BACKGROUND

Soybeans supply outstanding nutritional and nutraceutical benefits, and products containing a high percentage of soy are an excellent source of protein, iron, vitamin-B, calcium and isoflavones. Soy isoflavones are now considered helpful in reducing risks for cancer, heart disease, and osteoporosis. In addition, since soybeans do not contain particular glutens, products made from soy offer an alternative for people suffering from celiac disease or gluten allergies.

Unfortunately, there are several drawbacks to producing products from one hundred percent soy dough. Products that require forming by sheeting, rolling or flattening prior to cutting or die cutting of dough, such as tortillas, crackers, and flat breads cannot be produced from a one hundred percent soy dough using standard food processing equipment. Soybeans neither contain gluten forming proteins such as the prolamins, gliadin or glutenin, that provide elasticity, cohesiveness and binding. Nor do soybeans contain starches that help bind and expand dough, such as those starches contained in grains like corn or wheat. High soy content doughs therefore do not bind well, are sticky, and are not pliable. One hundred percent soy dough will not properly machine since it adheres to rollers and wires of dough sheeter heads and cannot be pressed out to a uniform thickness. Applying or spraying rollers or wires with water or cooking oil, as processing aids, does not achieve enough additional pliability or sheeting action for soy dough. These disadvantages have limited the use of soy flours in dough products to less than about thirty percent of total content. Typically, one sees recommendations to use soy flours replacing wheat or other grain flours at suggested rates such as two tablespoons per cup flour. In this case, less than thirteen percent of the total content is replaced by soy flour.

In addition to functional concerns, the taste and texture e.g. "mouth feel", of one hundred percent soy products can range from unpleasantly chalky to bland, bitter, and mealy. Further, due to soy dough's soft texture, soy products intended to be crisp are fragile and easily damaged during shipping to market.

Therefore, there exists a need for a soy-based dough, having the highest possible soy content, that can be processed using standard food processing equipment, and that can be used to produce products having an appealing taste and texture. Likewise, there is a need for such products offering improved nutrition and having greater strength for handling prior to sale. Finally, there is a need for products produced using standard food processing equipment, which can optionally contain conventional, natural, or certified organic ingredients.

SUMMARY OF THE INVENTION

According to the present invention, a cohesive soy-based machineable dough comprises dry ingredients including a soy component and a pre-gelatinized starch component and wet ingredients including water. Preferably, the soy component comprises from about 60% to about 90%, by weight, of the dry ingredients, the pre-gelatinized starch comprises from about 10% to about 40%, by weight, of the dry ingredients, and the wet ingredients comprise from about 25% to about 45%, by weight, of the total dough. Other optional ingredients may be used to modify taste and/or texture and include non-soy flours, leavening agents, oils, and milk or milk substitutes.

In another aspect of the present invention, a soy-based product comprises a baked sheeted dough prepared by mixing dry ingredients including a soy component and a pre-gelatinized starch with water at a temperature above the gelatinization temperature of the starch. Preferably, the soy component comprises from about 60% to about 90%, by weight, of the dry ingredients, the pre-gelatinized starch comprises from about 10% to about 40%, by weight, of the dry ingredients and the water comprises from about 25% to about 45%, by weight, of the total dough. Advantageously, the product may comprise flatbreads such as pitas and soft tortillas, crackers, snack chips, and other snack and bread products of various cuisines prepared from dough according to the invention.

In a further aspect of the present invention, a method of producing a soy-based product comprises preparing a dough by mixing dry ingredients including a soy component and a pre-gelatinized starch with wet ingredients, sheeting the dough, cutting a dough piece from the dough, and baking the dough piece. Preferably, the soy component comprises from about 60% to about 90%, by weight, of the dry ingredients, the starch comprises from about 10% to about 40%, by weight, of the dry ingredients, and the wet ingredients comprise from about 25% to about 45%, by weight, of the total dough. The dough piece may also be fried after baking.

DETAILED DESCRIPTION OF THE PREFERRED EMBODIMENTS

According to an embodiment of the invention, a cohesive soy-based machineable dough comprises dry ingredients including a soy component and a pre-gelatinized starch component, and wet ingredients, including water.

Preferably, the soy component is selected from the group consisting of soy flour, soy meal, soy grits, soy chips, soy protein concentrates, soy protein isolates, and mixtures thereof. Soy flours, meals, grits, and chips comprise roasted soybeans that have been ground to varying degrees. Soy protein concentrates and soy protein isolates are produced from soybeans that have been subjected to extraction and separation processes that increase their protein content. The soy component preferably comprises from about 60% to about 90%, by weight, of the dry ingredients.

Soy flours are available in enzyme active, full-fat, lecithinated, roasted, and reduced fat versions. Preferably, full-fat soy flour comprises from about 70% to about 90%, by weight, of the soy component of a dough according to the invention. More preferably, full-fat roasted soy flour comprises from about 70% to 90%, by weight, of the soy component of a dough according to the invention. Advantageously, full-fat soy flours provide reduction of fat absorption when products are fried, which gives a less greasy end product. In addition, oils in full-fat flours are considered to be stabilized giving longer shelf life to the end product. Attractive golden and browned colors can be achieved using full-fat soy flour. Soy grits, soy chips, and soy meals can be used to modify texture and taste while maintaining a high soy content in the final product. Preferably in crisp products, such as crackers or chips, soy grits comprise from about 10% to 30%, by weight, of the soy component.

The pre-gelatinized starch is preferably selected from the group consisting of grain or cereal starch, tuber starch, root starch, vegetable starch, legume starch, hybrid starch, and mixtures thereof. Advantageously, these may include pre-gelatinized cornstarch, rice starch, arrowroot starch, pea starch, tapioca starch, and potato starch. Pre-gelatinized starches comprise modified or natural raw starches that have been cooked to gelatinize varying portions of the starch followed by dehydration and pulverization. While raw or uncooked starch granules usually require the application of heat to swell, pre-gelatinized starches may begin swelling in cold water. However, elevated liquid temperatures produce more intense swelling at a faster rate in pre-gelatinized starches. The temperature at which gelatinization intensity increases varies depending on the starch. For many starches, the gelatinization temperature is between 110° and 160° F., i.e. 45° C. to about 70° C. However, the manufacturer's recommendation regarding mixing and hydration temperatures to achieve gelatinization should be followed as a good starting point for a particular starch used in the invention.

The intensified swelling, i.e., gelatinization of the starch provides viscosity, binding and expansion properties to the soy dough. Since the soy component of the dough contains no proper gluten proteins or suitable starch for binding and expansion, and comprises from about 60% to about 90%, by weight, of the dry ingredients of the dough, the pre-gelatinized starch imparts the cohesiveness necessary for dough machinability. Insufficient gelatinization causes the dough to adhere to the processing equipment and prevents achieving a uniform dough sheet of desired thickness. Therefore, preferably, the pre-gelatinized starch comprises from about 10% to about 40%, by weight, of the dry ingredients.

Preferably, the wet ingredients include water and may also include an animal milk or milk substitute. Milk substitutes include, but are not limited to soy beverages, soymilk, rice milk, and oat milk. Depending on the pre-gelatinized starch used, the wet ingredients may be at an elevated temperature.

In dough according to the invention, optional dry ingredients may be used to modify taste and/or texture, or to develop taste, crispness, or pliability of a dough according to the present invention. Taste, texture, and crispness can be modified by the addition of non-soy flours including raw or preferably pre-gelatinized grain, vegetable, plant or legume flours. Exemplary non-soy flours include raw or pre-gelatinized potato, corn, rice, tapioca, and arrowroot flour. Raw starches may also be used to modify pliability and texture. Preferably, raw starches include potato, corn, rice, and arrowroot starch and mixtures thereof. Conventional flavorings and seasonings may also be blended into the dough composition or topically applied upon the dough composition or applied to the product after baking.

In accordance with embodiments of the invention, leavening agents may be included in dough to produce products, which require a rising, such as crackers and breads. Exemplary leavening agents include yeast, baking powder, eggs, and other commercially available leavening agents. Preferably, leavening agents will comprise less than about 5%, by weight, of the dry ingredients.

Dough in accordance with embodiments of the invention may also include gums such as xanthum, guar, agar, and other commercially available hydrocolloids typically used for dough binding and conditioning. Additionally, food grade oils can be used to improve sheeting, texture, browning, and taste. Exemplary oils include soybean oil, canola oil, corn oil, and other commercially available oils. Lecithin may also be added to improve emulsification, water binding, and dough release.

A method of producing a soy-based product includes forming a cohesive dough by measuring and mixing the dry ingredients using standard mixing equipment. Wet ingredients are then added at the appropriate elevated temperature, i.e. from about 110° F. to about 160° F. Mixing is carried out preferably for about 3 to 10 minutes. The dough is then formed by sheeting, rolling, or flattening prior to cutting or die cutting using standard food processing equipment. The cut or formed dough pieces are then baked using conventional baking equipment as used for the production of breads, crackers, and chips, such as a Reading Bakery System convection oven comprising a cooker, two oven zones, and one kiln zone.

For production of a snack chip, cooker temperatures preferably may be set between 150° F. and 190° F., zone one oven temperatures may be maintained at approximately 560° F., zone two temperatures may range from about 480° F. and 520° F., and kiln temperatures may maintained at approximately 245° F. Proof time may be from about 0–9.4 minutes, cook time may preferably be from about 0–12.5 minutes, oven bake time may preferably be from about 1 to 2 minutes, and kiln time may be from about 3.5 to 8.0 minutes. Oven temperatures and total baking and cooking times will vary depending on oven type, dough composition, and resonance time. In some embodiments, the dough may also be fried after baking.

The following examples illustrate the present invention, wherein all parts and percentages are by weight and all temperatures are in degrees F unless indicated to the contrary:

EXAMPLE 1

Ingredients, and their relative amounts, which may be used to prepare a cohesive soy-based machineable dough for producing a snack having a tortilla-chip like appearance, flavor, and texture, are:

| DRY INGREDIENTS | |
|---|---|
| Full-fat roasted soy flour | 61% by weight of dry ingredients |
| Soy grits | 10% by weight of dry ingredients |
| Pre-gelatinized corn starch | 10% by weight of dry ingredients |
| Pre-gelatinized rice flour | 10% by weight of dry ingredients |
| Standard yellow corn masa | 8% by weight of dry ingredients |
| Lecithin | 1% by weight of dry ingredients |
| WET INGREDIENTS | |
| Water | 31% by weight of total dough |

EXAMPLE 2

Ingredients, and their relative amounts, which may be used to prepare a cohesive soy-based machineable dough for producing a snack having a soft-tortilla like appearance, flavor, and texture, are:

| DRY INGREDIENTS | |
|---|---|
| Full-fat roasted soy flour | 60% by weight of dry ingredients |
| Soy grits-fine mesh | 9% by weight of dry ingredients |
| Pre-gelatinized corn starch | 12% by weight of dry ingredients |
| Pre-gelatinized rice flour | 8% by weight of dry ingredients |
| Potato starch | 8% by weight of dry ingredients |
| Baking powder | 0.5% by weight of the dry ingredients |

-continued

| | |
|---|---|
| Guar gum + Xanthum gum | 0.5% by weight of the dry ingredients |
| Soy oil | 1% by weight of the dry ingredients |
| Lecithin | 1% by weight of dry ingredients |
| WET INGREDIENTS | |
| Water | 32% by weight of total dough |

EXAMPLE 3

Ingredients, and their relative amounts, which may be used to prepare a cohesive soy-based machineable dough for producing a snack having a leavened pita-bread like appearance, flavor, and texture, are:

| | |
|---|---|
| DRY INGREDIENTS | |
| Full-fat roasted soy flour | 63% by weight of dry ingredients |
| Soy grits-fine mesh | 8% by weight of dry ingredients |
| Pre-gelatinized corn starch | 12% by weight of dry ingredients |
| Pre-gelatinized rice flour | 9% by weight of dry ingredients |
| Potato starch | 7% by weight of dry ingredients |
| Active dry yeast | 0.2% by weight of the dry ingredients |
| Lecithin | 0.8% by weight of dry ingredients |
| WET INGREDIENTS | |
| Water | 35% by weight of total dough |

EXAMPLE 4

Ingredients, and their relative amounts, which may be used to prepare a cohesive soy-based machineable dough for producing a snack having a leavened cracker like appearance, flavor, and texture, are:

| | |
|---|---|
| DRY INGREDIENTS | |
| Full-fat roasted soy flour | 60% by weight of dry ingredients |
| Soy grits | 9% by weight of dry ingredients |
| Pre-gelatinized corn starch | 12% by weight of dry ingredients |
| Pre-gelatinized rice flour | 10% by weight of dry ingredients |
| Baking powder | 1% by weight of the dry ingredients |
| Soy oil | 7% by weight of the dry ingredients |
| Lecithin | 1% by weight of dry ingredients |
| WET INGREDIENTS | |
| Water | 33% by weight of total dough |
| Soy milk | 2% by weight of total dough |

EXAMPLE 5

Ingredients, and their relative amounts and the method, which may be used to produce a soy-based product having a tortilla-chip like appearance, flavor, and texture, are:

| | |
|---|---|
| DRY INGREDIENTS | |
| Full-fat roasted soy flour | 61% by weight of dry ingredients |
| Soy grits | 10% by weight of dry ingredients |
| Pre-gelatinized Corn Starch | 10% by weight of dry ingredients |
| Potato starch | 9% by weight of dry ingredients |
| Corn masa | 9% by weight of dry ingredients |
| Lecithin | 1% by weight of dry ingredients |
| WET INGREDIENTS | |
| Water | 30% by weight of total dough |

To make a tortilla-chip, the dry ingredients were measured and then mixed using a 600 lb. Peerless Paddle Mixer. Water at 120° F. was added in stages to determine the proper point of hydration, for example until about 30.3% by weight of the total dough was reached. After mixing for approximately 7 minutes, the dough was fed to a Casa Herrera single-stage sheeter having an 8-row cutter, and operating at a rate of 32 turns/minute. The sheeted and cut dough was conveyed through a Casa Herrera 2000 BTU radiant heat oven with temperatures maintained from about 460° F. to about 540° F. Following baking, the dough pieces were directed to a Casa Herrera fryer system having a temperature from about 350° F. to 360° F., and fried until crisp.

I claim:

1. A cohesive soy-based machineable dough comprising:
   dry ingredients including:
      a soy component comprising from about 60% to about 90% by weight, of the dry ingredients; and
      a pre-gelatinized starch comprising from about 10% to about 40%, by weight, of the dry ingredients; and
      wet ingredients including water comprising from about 25% to about 45% by weight of the dough,
   wherein the soy component is selected from the group consisting of soy flour, soy meal, soy grits, soy chips, soy protein concentrate, soy protein isolates, and mixtures thereof, the soy component comprising from about 70% to about 90%, full-fat soy flour, by weight of the soy component and from about 10% to about 30%, soy grits, by weight of the soy component.

2. The cohesive soy-based dough according to claim 1, wherein pre-gelatinized starch is selected from the group consisting of pre-gelatinized grain starch, pre-gelatinized tuber starch, pre-gelatinized root starch, pre-gelatinized vegetable starch, pre-gelatinized legume starch, and mixtures thereof.

3. The cohesive soy-based dough according to claim 1 wherein the dry ingredients further comprise a non-soy flour selected from the group consisting of grain flour, vegetable flour, plant flour, legume flour, and mixtures thereof, comprising less than about 30%, by weight, of the dry ingredients.

4. The cohesive soy-based dough according to claim 3, wherein the non-soy flour comprises a pre-gelatinized flour.

5. The cohesive soy-based dough according to claim 1 wherein the dry ingredients further comprise a leavening agent comprising less than about 5%, by weight, of the dry ingredients.

6. The cohesive soy-based dough according to claim 1, wherein the wet ingredients further comprise a milk.

7. The cohesive soy-based dough according to claim 1, wherein the wet ingredients further comprise a milk-substitute.

8. A soy-based product comprising a baked sheeted dough, the dough being prepared by mixing dry ingredients including a soy component and a pre-gelatinized starch with water at a temperature above the gelatinization temperature of the starch, the soy component comprising from about 60% to about 90% by weight of the dry ingredients, the pre-gelatinized starch comprising from about 10% to about 40% by weight of the dry ingredients, and the water comprising from about 25% to about 45% by weight of the dough.

9. The soy-based product according to claim 8, wherein the soy component is selected from the group consisting of soy flour, soy meal, soy grits, soy chips, soy protein concentrate, soy protein isolates, and mixtures thereof.

10. The soy-based product according to claim 9, wherein the soy component comprises from about 70% to about 90%, full-fat soy flour, by weight of the soy component.

11. The cohesive soy-based product according to claim 10, wherein the soy component comprises from about 10% to about 30%, soy grits, by weight of the soy component.

12. The soy-based product according to claim 8, wherein the pre-gelatinized starch is selected from the group consisting of pre-gelatinized grain starch, pre-gelatinized tuber starch, pre-gelatinized root starch, pre-gelatinized vegetable starch, pre-gelatinized legume starch, and mixtures thereof.

13. The soy-based product according to claim 8 wherein the dry ingredients further comprise a leavening agent comprising less than about 5%, by weight, of the dry ingredients.

14. The soy-based product according to claim 13 wherein the product is a bread.

15. The soy-based product according to claim 13 wherein the product is a cracker.

16. The soy-based product according to claim 8 wherein the product is a chip.

17. The cohesive soy-based dough according to claim 1 wherein the dry ingredients further comprise one or more gums or hydrocolloids, comprising less than about 1% by weight of the dry ingredients.

18. The soy-based product according to claim 8 wherein the dry ingredients further comprise one or more gums or hydrocolloids, comprising less than about 1% by weight of the dry ingredients.

19. A cohesive soy-based machineable dough comprising:
dry ingredients including:
a soy component comprising from about 60% to about 90% by weight, of the dry ingredients; and
a pre-gelatinized starch comprising from about 10% to about 40%, by weight, of the dry ingredients; and
wet ingredients including water comprising from about 25% to about 45% by weight of the dough, wherein the dry ingredients further comprise a leavening agent comprising less than about 5%, by weight, of the dry ingredients.

20. The cohesive soy-based dough according to claim 19, wherein the soy component is selected from the group consisting of soy flour, soy meal, soy grits, soy chips, soy protein concentrate, soy protein isolates, and mixtures thereof.

21. The cohesive soy-based dough according to claim 20, wherein the soy component comprises from about 70% to about 90%, full-fat soy flour, by weight of the soy component.

22. The cohesive soy-based dough according to claim 21 wherein the dry ingredients further comprise one or more gums or hydrocolloids, comprising less than about 1% by weight of the dry ingredients.

* * * * *